United States Patent
Pearce (10) Patent No.: US 6,946,897 B2
(45) Date of Patent: Sep. 20, 2005

(54) TECHNIQUE FOR MEASURING TEMPERATURE AND CURRENT VIA A MOSFET OF A SYNCHRONOUS BUCK VOLTAGE CONVERTER

(75) Inventor: Lawrence G. Pearce, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 156 days.

(21) Appl. No.: 10/691,370

(22) Filed: Oct. 22, 2003

(65) Prior Publication Data

US 2005/0088863 A1 Apr. 28, 2005

(51) Int. Cl.⁷ .............................................. H03K 3/42
(52) U.S. Cl. ..................................... 327/513; 327/538
(58) Field of Search ........................... 327/512, 513, 327/530, 538; 324/119, 120

(56) References Cited

U.S. PATENT DOCUMENTS

| | | | | |
|---|---|---|---|---|
| 3,947,706 A | * | 3/1976 | Holmes | 327/538 |
| 5,764,032 A | | 6/1998 | Moore | 320/126 |
| 6,445,244 B1 | * | 9/2002 | Stratakos et al. | 327/540 |

* cited by examiner

*Primary Examiner*—Adolf Berhane
(74) *Attorney, Agent, or Firm*—Allen, Dyer, Doppelt, Milbrath & Gilchrist, P.A.

(57) ABSTRACT

In order to derive a precise measurement of temperature and current in a synchronous buck DC-DC converter a synchronous conduction cycle measurement of the value of reverse conduction voltage ($V_{ON}$), and an asynchronous conduction cycle measurement of the value of body diode conduction voltage ($V_{DF}$) of the low side power MOSFET are performed. These two measured values are then used as dual inputs to a two-dimensional to two-dimensional transform function (e.g., look-up table) that is effective to map the measured voltage values into output values for current (I) and temperature (T).

15 Claims, 6 Drawing Sheets

TECHNIQUE FOR MEASURING TEMPERATURE AND CURRENT VIA A MOSFET OF A SYNCHRONOUS BUCK VOLTAGE CONVERTER

FIELD OF THE INVENTION

The present invention relates in general to power supply circuits and components therefor, and is particularly directed to a scheme for deriving a precise measurement of temperature and current in a synchronous buck DC-DC converter by performing a synchronous conduction cycle measurement of the value of MOSFET reverse conduction voltage ($V_{ON}$), and an asynchronous conduction cycle measurement of the value of body diode conduction voltage ($V_{DF}$) of said low side power MOSFET. These two measured values are then used as dual inputs to a two-dimensional to two-dimensional transform function (e.g., look-up table) that is effective to produce values for current (I) and temperature (T).

BACKGROUND OF THE INVENTION

Many user specifications for high performance synchronous buck mode DC-DC converters mandate the ability to monitor both current and temperature of the power elements. This is especially the case in more recently developed core voltage regulators employed by the central processing units (CPUs) of microprocessor-based electronic equipment. These regulators are typically implemented as multiphase converters having tightly specified load lines (effective output resistance), which require accurate information as to the current the regulator is supplying. Temperature measurement has customarily been limited to providing thermal compensation for the current measurement along with some form of thermal shutdown control; however, more recent specifications have been moving toward additional uses for thermal measurements, including throttling of CPU operation and system 'telemetry' data.

Figure 1:
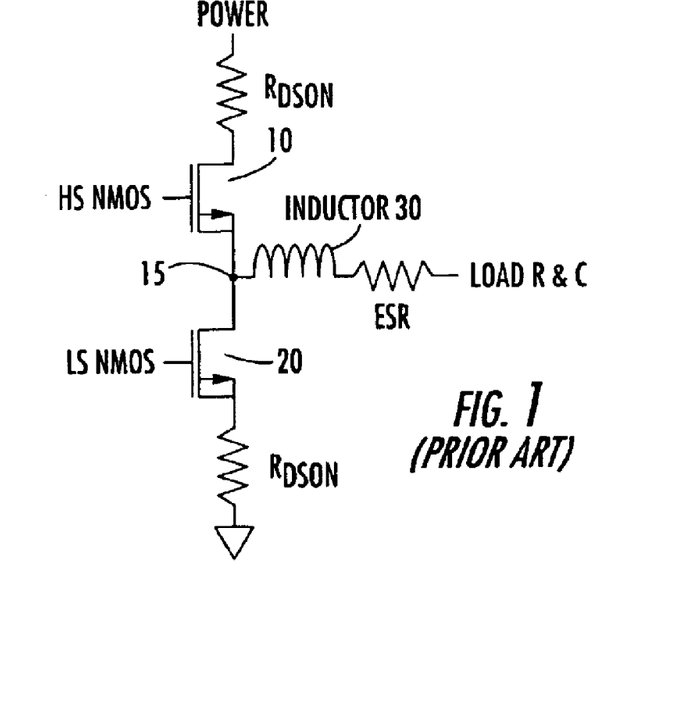
FIG. 1 diagrammatically illustrates the basic circuitry configuration of a synchronous buck mode DC-DC voltage converter with parasitic resistance components.

The basic half-bridge phase of a synchronous buck converter is diagrammatically illustrated in FIG. 1 as comprising a high side MOSFET 10 having its source-drain current path coupled in series with that of a low side MOSFET 20 between a pair of power supply rails (Vdd and ground (GDN)); the common connection 15 of the two MOSFETs coupled to an inductor 30 that feeds a downstream load terminal. Also shown in FIG. 1 are parasitic resistances associated with the above components, in particular the parasitic resistance $R_{DSON10}$ of the high side MOSFET 10, the parasitic resistance $R_{DSON20}$ of the low side MOSFET 20, and the effective series resistance ESR of the inductor 30. Now although these parasitic components allow indirect measurement of the inductor current, there are practical problems associated with their use.

First of all, all three elements have a temperature dependency, which must be measured and compensated if accurate current data is to be extracted from associated voltage measurements thereacross. Prior art systems usually employ a thermistor to measure temperature adjacent to the most important heat source. Unfortunately, cost and space considerations often limit such temperature-sensing to only a single location. In a multiphase system this becomes particularly problematic as it limits the ability to detect thermal problems that may be indicative of an impending failure. There is also the issue of manufacturing tolerance, which must either satisfy system accuracy requirements or requires calibration.

One approach to circumventing these problems is to insert a precision measurement resistor into one of the half-bridge branches, and provide temperature compensation for the precision measurement resistor. However, this results in additional energy dissipation and added components in the overall converter design. Another approach to current measurement is to incorporate a pilot (current mirror) FET with either the high side or low side MOSFET. This latter scheme is a special purpose power device and still requires accurate current measurement on the pilot current.

SUMMARY OF THE INVENTION

In accordance with the present invention, the above-discussed problems are effectively obviated by a new and improved current and temperature measurement methodology, that takes advantage of the fact that the two modes of conduction of the low side MOSFET (operating either as a MOSFET or as a diode) in a buck mode DC-DC converter exhibit distinct current vs. MOSFET reverse conduction voltage ($V_{ON}$) and current vs. body diode forward conduction voltage ($V_{DF}$) characteristics, and also opposite temperature vs. such voltage dependencies. This difference in behaviors for the respective modes of operation of the MOSFET enables measured values of the two conduction mode voltages ($V_{ON}$, $V_{DF}$) to be two-dimensionally transformed or mapped into temperature vs. current pairs (T,I).

In order to exploit the mapping of $V_{ON}$, $V_{DF}$ data to T,I data, a two-dimensional to two-dimensional look-up table (LUT) may be employed. Input values to the look-up table are derived by digitizing the low side MOSFET's reverse conduction voltage $V_{ON}$ obtained during a synchronous measurement operation, and body diode forward conduction voltage $V_{DF}$ obtained during an asynchronous measurement operation. These digital voltage values are then coupled to a processor-associated memory which contains the LUT for mapping the ($V_{ON}$, $V_{DF}$) data to (T,I) data. The ($V_{ON}$, $V_{DF}$) values may correspond to row and column addresses that are applied to two memory units representing temperature and current. Where measured voltage value points do not exactly coincide with look-up table grid points, interpolation may be performed to derive the associated temperature and current values.

As noted, measurements through which the look-up table input voltage pairs are obtained are synchronous for deriving the value of the low side MOSFET's reverse conduction voltage $V_{ON}$, and non-synchronous for deriving the value for the MOSFET's body diode forward conduction voltage $V_{DF}$. Since temperature variation is relatively gradual and needs only infrequent sampling, $V_{DF}$ can be measured relatively infrequently. Between $V_{DF}$ measurements, the temperature can be effectively treated as a constant and the value of $V_{ON}$ can be applied to current monitoring as in a standard $R_{DSON}$ monitoring scheme.

DETAILED DESCRIPTION

As described briefly above, the present invention takes advantage of the fact that a MOSFET used as the synchronous rectifier in a buck mode DC-DC voltage converter is able to provide both temperature and current information with respect to that MOSFET. In standard buck mode DC-DC voltage converter, a low side diode is used for the circulation current pass element. A diode, per se, provides too large a dissipation in low voltage buck mode converters due to the forward voltage drop of the diode. Employing a MOSFET synchronous rectifier serves to reduce such dissipation, since when the MOSFET is conducting or active, the voltage drop can be much lower than that of a diode.

Figure 2:
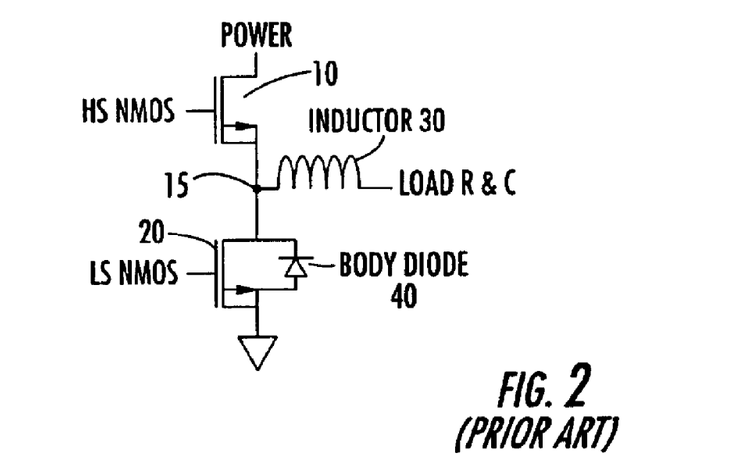
FIG. 2 replicates the circuitry configuration of FIG. 1 absent the parasitic resistance components and showing the body diode of the low side MOSFET.

As diagrammatically illustrated in FIG. 2, inherent in a standard MOSFET (here, the low side MOSFET 20) is a body diode 40 that is coupled in parallel with the MOSFET conduction path. When the MOSFET 20 is non-conductive (inactive), the converter operates in non-synchronous mode. The two modes of conduction of the low side MOSFET 20. (either as a MOSFET or as a diode) exhibit both distinct current (I) v. voltage (V) characteristics and also opposite temperature dependencies. Pursuant to the invention, such difference in behaviors for the two modes enables knowledge of both conduction mode voltages to be transformed into a unique pair of temperature and current characteristics.

More particularly, the 'ideal' semiconductor diode exhibits and I-V characteristic as defined in the following equation (1):

$$I = KT^3 \exp(-Vg/kT)(\exp(V/nkT)-1) \quad (1)$$

wherein T is absolute temperature, Vg is the semiconductor gap voltage (1.1 eV for Si), k is Boltzmann's constant (8.62 eV/° K), V is the voltage applied across the diode junction, and n is an ideality factor (where n is a value greater than or equal to 1 and less than or equal to 2). The constant K is a value that incorporates diode geometry effects. For purposes of the present discussion, the diode will be assumed to be in series with a resistive element, so that the full diode relation may be defined in equation (2) as:

$$I = KT^3 \exp(-Vg/kT)(\exp(\{V-IR_{DIO}(T)\}/NKt)-1) \quad (2)$$

wherein the resistance $R_{DIO}$ of the resistive element is a function of temperature. For purposes of convenience, in the present discussion, this resistance will be assumed to proportional to the MOSFET's source-drain path conduction or ON-resistance $R_{DSON}$. $R_{DSON}$ is normally well defined as a second order function of temperature as set forth in equation (3):

$$R_{DSON}(T) = R_{DSON}(T_0)\{1+\alpha(T-T_0)+\beta(T-T_0)^2\} \quad (3)$$

Figure 3:
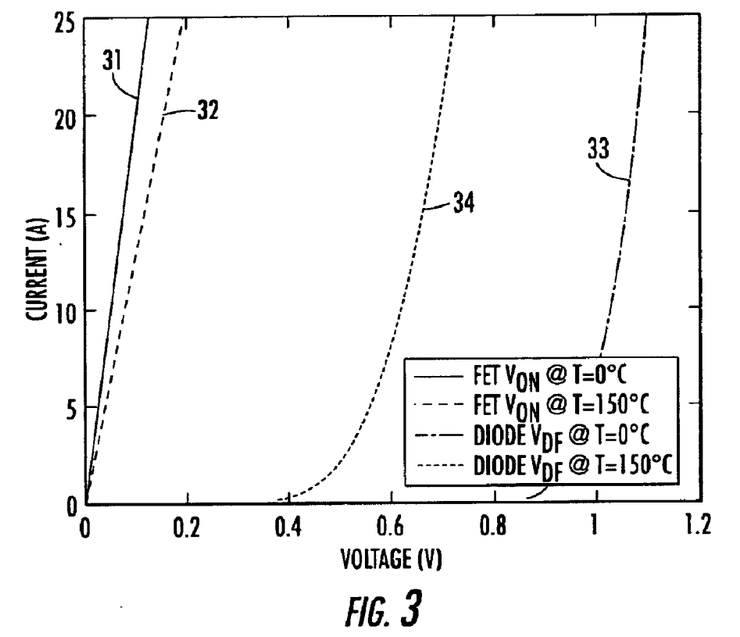
FIG. 3 is a graph showing variations of current with MOSFET reverse conduction voltage ($V_{ON}$) and with MOSFET body diode forward conduction voltage ($V_{DF}$)

On the basis of the above two conduction relationships, I-V characteristics of the MOSFET can be plotted in FIG. 3 for the set of parameters: $K=1e4$; $n=1.5$; $R_{DSON}(T_0)=5$ milliohms, $R_{DIO}=R_{DSON}/2$; $T_0=25°$ C.; $\alpha=2.5e-3/°C$.; and $\beta=1.25e-5/°C.^2$.

As can be seen in FIG. 3, for increase in temperature, the reverse conduction characteristic ($V_{ON}$) of the MOSFET undergoes a slight decrease in slope from curve 31 to curve 32, so that a somewhat larger voltage is required to achieve the same current. On the other hand, the forward conduction ($V_{DF}$) of the MOSFET body diode requires a lower voltage to achieve the same current at a higher temperature as shown at curves 33 and 34.

Figure 4:
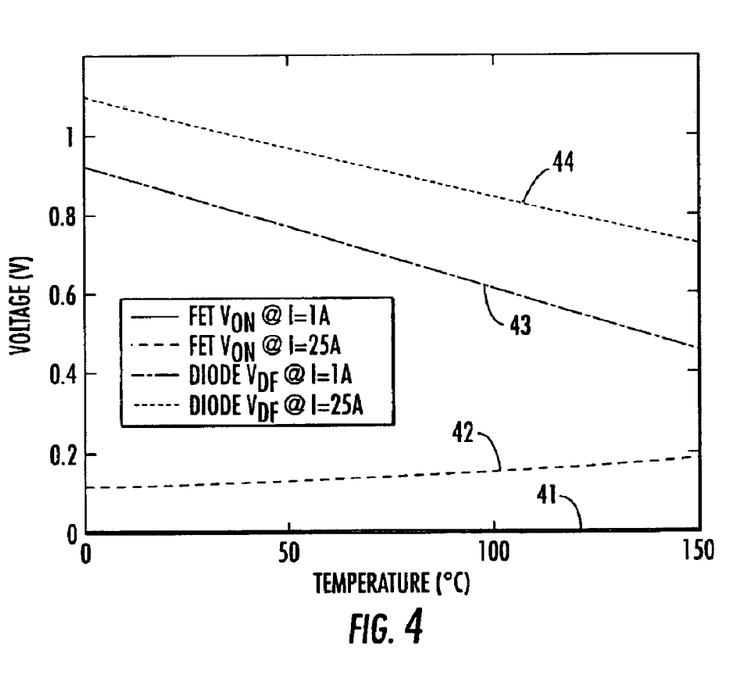
FIG. 4 is a graph showing variations of MOSFET reverse conduction voltage ($V_{ON}$) and MOSFET body diode forward conduction voltage ($V_{DF}$) with temperature.

FIG. 4 plots voltage as a function of temperature for each of the reverse conduction characteristic ($V_{ON}$) and forward conduction ($V_{DF}$) of the MOSFET body diode. Curves 41 and 42 correspond to the reverse conduction characteristic ($V_{ON}$), whereas curves 43 and 44 correspond to the forward conduction ($V_{DF}$) characteristic. Again, the behaviors of the two characteristics are opposite to one another.

Figure 5:
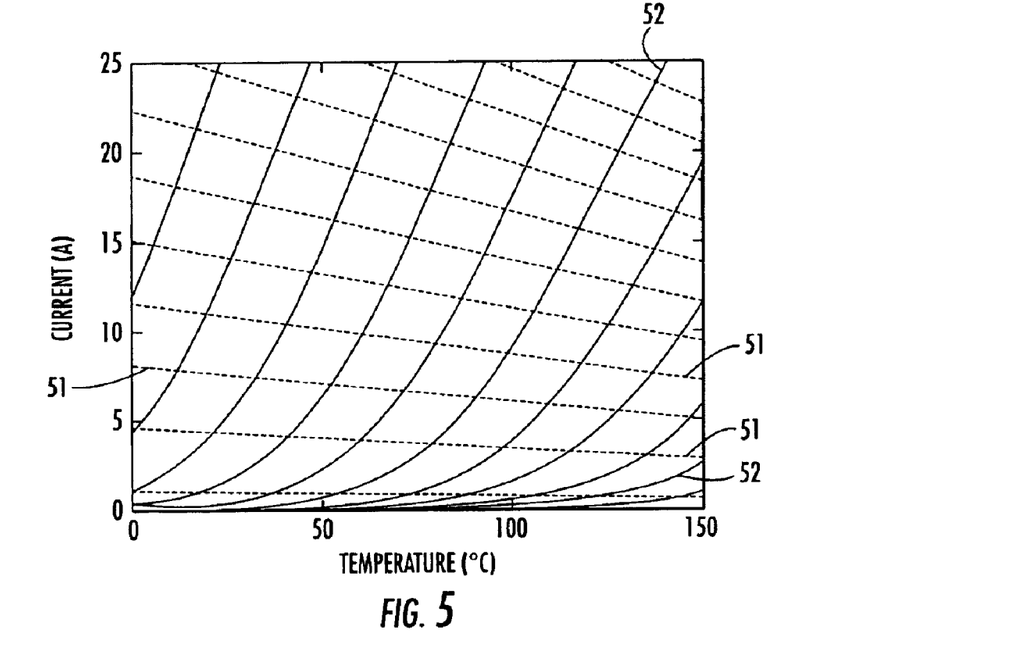
FIG. 5 is two-dimensional map of current vs. temperature for constant value contours of MOSFET reverse conduction voltage ($V_{ON}$) and MOSFET body diode forward conduction voltage ($V_{DF}$)
Figure 6:
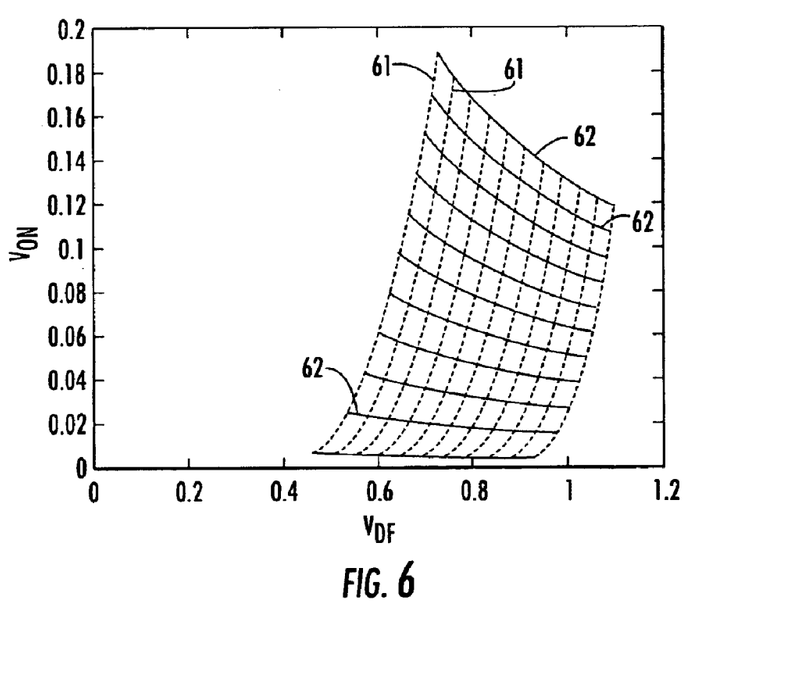
FIG. 6 is an inverse plot of the two-dimensional map of FIG. 5.

These differences in current vs. voltage and voltage vs. temperature allow a two-dimensional mapping of temperature and current pairs (T,I) to MOSFET and diode voltage drop pairs ($V_{ON}$, $V_{DF}$). FIG. 5 shows such mapping in one direction, rectilinear coordinates in temperature and current (T,I) with constant $V_{ON}$ contours as broken lined curves 51 and constant $V_{DF}$ contours as solid lined curves 52. FIG. 6 shows an inverse mapping of the plot of FIG. 5 with rectilinear coordinates in the conduction voltages ($V_{DF}$, $V_{ON}$) and constant temperature (T) contours as broken lined curves 61 and constant current (I) contours as solid lined curves 62.

Although the rectangular, two-dimensional domain of temperature and current in FIG. 5 ($0<T<150°$ C., $1<I<25A$) is seen to undergo a geometric curvilinear distortion when viewed in the $V_{ON}$-$V_{DF}$ coordinates of FIG. 6, it will be readily appreciated that, mathematically, there is a clear reciprocal mapping between ($V_{ON}$, $V_{DF}$) locations and (T,I) locations. Moreover, even though the present example employs specific functional dependencies, the important aspects necessary to yield the mapping are the opposing temperature trends and the differing I–V forms (linear vs. exponential).

Figure 7:
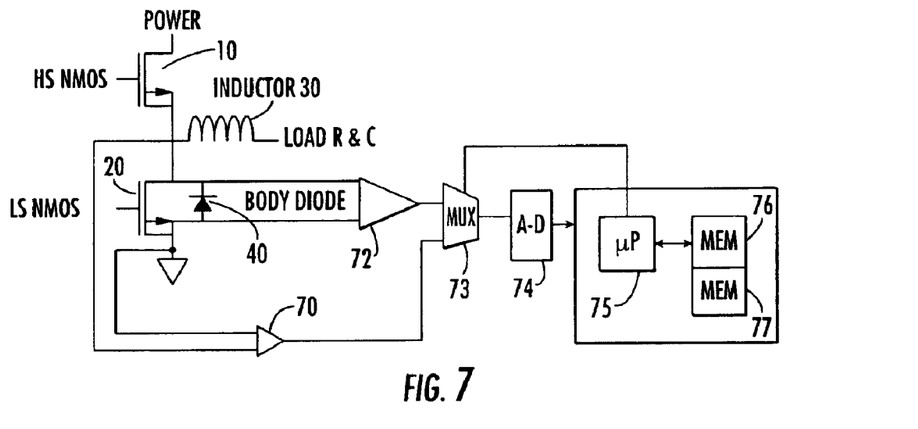
FIG. 7 shows a measured voltage parameter processing architecture for implementing the present invention.

A relatively straightforward implementation to exploit the two-dimensional mapping (conversion of ($V_{ON}$, $V_{DF}$) data to (T,I) data) involves the use of a two-dimensional to two-dimensional look-up table (LUT), as diagrammatically illustrated in FIG. 7. As shown therein, the low side MOSFET's reverse conduction voltage $V_{ON}$ and the MOSFET's body diode forward conduction voltage $V_{DF}$ are coupled through respective buffer amplifiers 70 and 72 via a multiplexer to an A–D converter 74. The digitized values are then supplied to a processor 75, which contains the LUTs for mapping the ($V_{ON}$, $V_{DF}$) data to (T,I) data. The ($V_{ON}$, $V_{DF}$) values are converted into row and column addresses that are applied to the two memory units 76 and 77 representing temperature and current.

Figure 8:
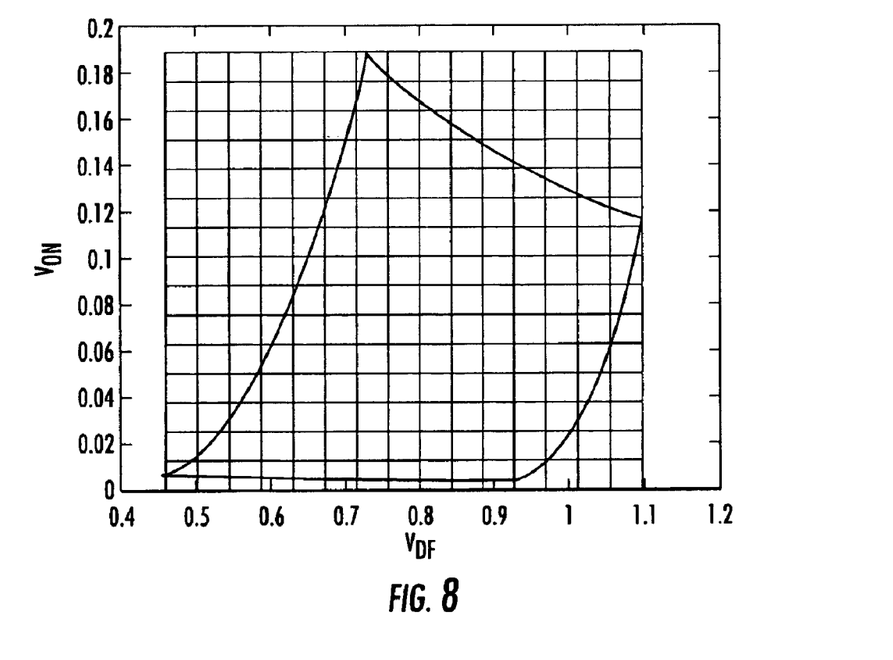
FIG. 8 shows the two-dimensional map of FIG. 6 as standard rectilinear two-dimensional LUT utilizing a 16×16 grid (512 memory locations) in terms of an orthogonal set of MOSFET reverse conduction voltage ($V_{ON}$) and MOSFET body diode forward conduction voltage ($V_{DF}$) coordinates.

FIG. 8 shows a standard rectilinear two-dimensional LUT utilizing a 16×16 grid (512 memory locations). Because the data is quantized, there is a need for interpolation between locations. In addition, the distortion of the mapping will lead to memory locations that fall outside the T–I domain of interest. Compromising between interpolation precision and memory size is relatively straightforward. Providing more memory decreases the error of using grid-points without interpolation. On the other hand, interpolation can be employed to reduce error without increasing memory.

Figure 9:
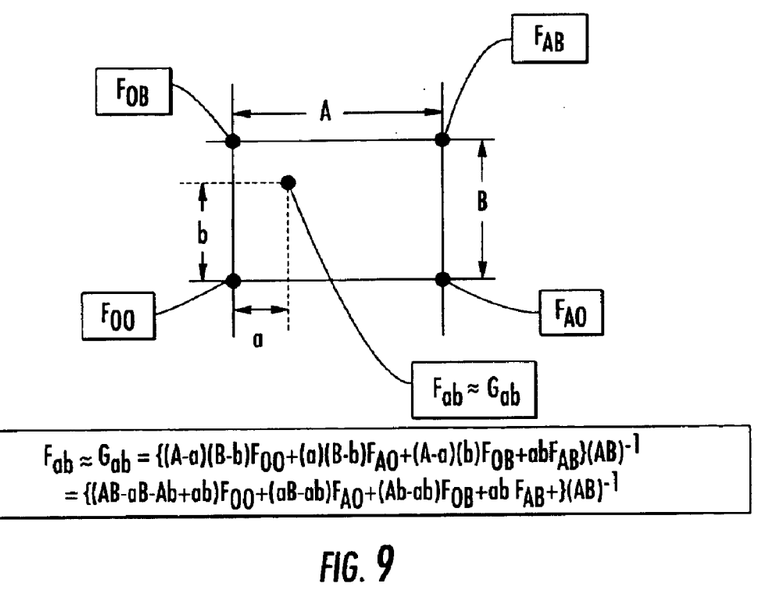
FIG. 9 shows a reduced complexity rectangular grid-based interpolation scheme.

FIG. 9 shows a reduced complexity rectangular grid-based interpolation scheme. This interpolation reduces to the LUT values at the four corners: $F_{00}$, $F_{A0}$, $F_{AB}$, $F_{0B}$, and yields the average of the corners at the center of the rectangle defined by the corners. This relatively simple interpolation still implies a reasonable computational burden, but one that is readily accomplished using current digital integrated circuits.

In the case of the present example, the maximum current is 25 A and $R_{DSON}$ has a normalized range of 1:1.60 (0–150° C. yields a range of 0.95–1.51 for a ratio of 1.60). If a one amp resolution of the LUT is desired, then the $V_{ON}$ range (being proportional to I) must have 1.60×25 or 40 grid points. Rounding this up to the nearest power of 2 and assuming an equal address space in $V_{DF}$ yields (64×64×2= $2^{13}$) or 8K LUT memory addresses. Further, assuming a data width of eight bits (on the order of +/–1% of full scale resolution on T and I), the required LUT memory is 8 Kbytes.

Figure 10:
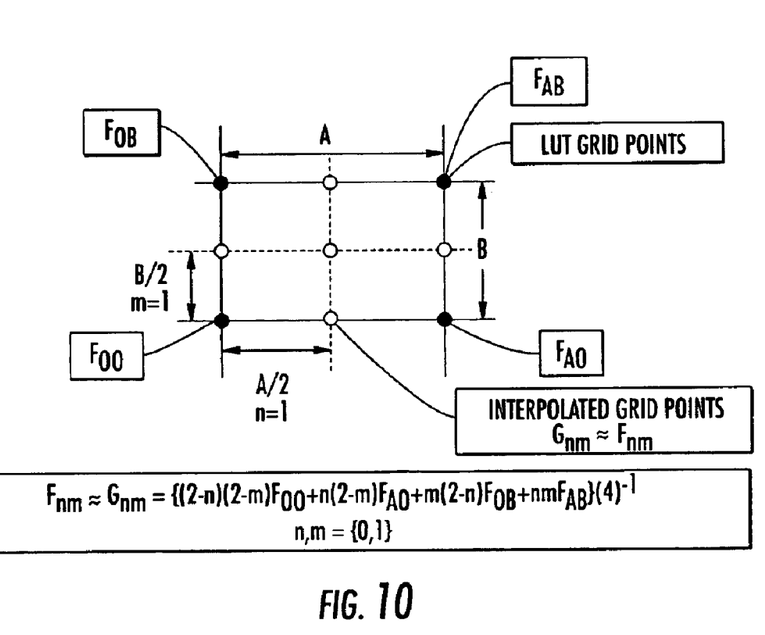
FIG. 10 shows a half-grid version of the interpolation scheme of FIG. 9.

A reasonable compromise between memory and interpolation complexity is to employ the interpolation of FIG. 9 only for the half-grid points (a=A/2, b=B/2). This simplifies the interpolation to the grid shown in FIG. 10, wherein:

$$F'_{nm}=G_{nm}=\{(2-n)(2-m)F_{00}+(n)(2-m)F_{A0}+(2-n)(m)F_{0B}+nmF_{AB}\}/4,$$
wherein $n,m=\{0,1\}$ $$F'_{00}=G_{00}=F_{00}$$

$$F'_{10}=G_{10}=\{F_{00}+F_{A0}\}/2$$

$$F'_{01}=G_{01}=\{F_{00}+F_{0B}\}/2$$

$$F'_{11}=G_{11}=\{F_{00}+F_{A0}+F_{0B}+F_{AB}\}/4.$$

In this scheme the number of LUT locations has been increased by approximately 4×. The computational advantage is that all multiplications are by a power of two (bit shifts).

The foregoing discussion, which assumes that the 2D—2D mapping is known with essentially infinite accuracy, neglects two issues. The first is the ability to accurately measure the mapping. While this is not a significant issue for a specific MOSFET, it should be noted that any given MOSFET exhibits a statistical distribution in performance. Unless each MOSFET is individually characterized and an associated unique LUT generated, the variation of the MOSFETs will be a dominant form of error in the mapping. If accuracy better than the 'average' LUT is required, some form of self-calibration will be necessary. One way to do this is to conduct an end-of-manufacture calibration for the complete voltage regulator, i.e., after the MOSFETs have been installed in the converter. If the procedure supplies a known value of current through a specific MOSFET at a known temperature, then there will at least be one point of comparison between the ensemble mapping and that for the specific MOSFET. This effectively produces a mapping offset for each voltage pair $V_{ON}$ and $V_{DF}$.

Figure 11:
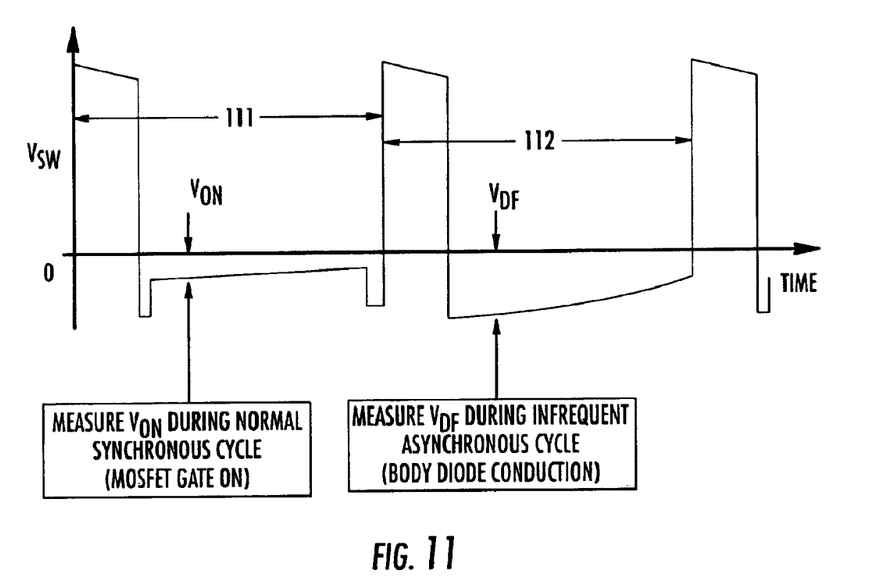
FIG. 11 is a timing diagram illustrating the manner in which measurements through which the voltage pairs are obtained are synchronous for the low side MOSFET's reverse conduction voltage $V_{ON}$, and non-synchronous for the MOSFET's body diode forward conduction voltage $V_{DF}$.

The measurements through which the voltage pairs are obtained are synchronous for deriving the value of the low side MOSFET's reverse conduction voltage $V_{ON}$, and non-synchronous for deriving the value for the MOSFET's body diode forward conduction voltage $V_{DF}$. FIG. 11 illustrates the manner in which these measurements may be carried out. $V_{ON}$ is shown as being measured in the first cycle 111, which is standard for systems that monitor the low-side MOSFET's $R_{DSON}$ to determine current. Even during this normal synchronous operation there is a brief interval at each switching transition that the MOSFET's body diode is conducting, but for reasons of power dissipation, this is kept as short as possible. As a result, measuring the value of $V_{DF}$ during this interval is not practical from both a timing consideration and from a noise (ringing after the sharp transitions) aspect.

The second cycle 112 represents an asynchronous switching cycle in which the MOSFET is not turned on and conduction occurs only through the MOSFET's body diode. As a consequence $V_{DF}$ is measured during this cycle. Since any temperature variation is relatively gradual and needs only infrequent sampling, $V_{DF}$ can be measured relatively infrequently. At a switching rate of 1 MHz and a 1% $V_{DF}$ measurement ratio, the temperature may be measured every 100 microseconds, which is still a very good rate in terms of the converter's thermal time constants. The one percent $V_{DF}$ cycles keep the system loss in efficiency due to the asynchronous operation to a very small level. Between $V_{DF}$ measurements, the temperature can be effectively treated as a constant and the value of $V_{ON}$ can be applied to current monitoring as in a standard $R_{DSON}$ monitoring scheme. Of course, the MOSFET can be turned on immediately following the asynchronous $V_{DF}$ measurement, so that it is not necessary to drop synchronous operation for the entire switching period.

It may be noted that the foregoing description implies zero inductor current ripple. As inductor current ripple increases (corresponding to the slope of $V_{SW}$ between transitions) there is a potential for error. This may be accommodated by employing empirical offsets or conducting multiple measurements during a cycle, to establish slope and thus extrapolate adjusted voltage values. These adjusted voltage values would then be supplied as inputs to the two-dimensional mapping scheme described above.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. For use with a buck mode DC-DC voltage converter having first and second electronic power switching devices coupled between respective power supply terminals, and a common node thereof coupled through an inductor to a regulated voltage output voltage terminal, a method of deriving a measure of current through and associated temperature of operation of said switching devices comprising the steps of:

(a) measuring said first and second electronic parameters of one of said first and second electronic power switching devices; and (b) processing values of said first and second electronic parameters as measured in step (a) in accordance with a transform function that is effective to produce-values for said current and temperature based upon said measured first and second electronic parameters of one of said first and second electronic power switching devices.

2. The method according to claim 1, wherein step (b) includes storing a map of current and temperature values in terms of said first and second electronic parameters of said one of said first and second electronic power switching devices, and coupling values of said first and second electronic parameters measured in step (a) to said map and extracting therefrom values of said current and temperature for said one of said first and second electronic power switching devices.

3. The method according to claim 2, wherein said first and second electronic power switching devices comprise power MOSFETs, and said first and second electronic parameters correspond to reverse conduction voltage ($V_{ON}$) and body diode conduction voltage ($V_{DF}$) of said one of said first and second power MOSFETs.

4. The method according to claim 3, wherein step (a) comprises measuring said conduction voltage ($V_{ON}$) during a synchronous conduction cycle and measuring said body diode conduction voltage ($V_{DF}$) during an asynchronous conduction cycle for said one of said first and second power MOSFETs.

5. The method according to claim 3, wherein step (b) comprises interpolating values of current and temperature for said one of said first and second electronic power MOSFETs from values of current and temperature contained in said map.

6. The method according to claim 1, wherein said first and second electronic power switching devices comprise respective high side and low side power MOSFETs of said DC-DC voltage converter, and said first and second electronic parameters correspond to reverse conduction voltage ($V_{ON}$) and body diode conduction voltage ($V_{DF}$) of said low side power MOSFET.

7. A method of deriving a measure of current and temperature values in a buck mode DC-DC voltage converter having high side and low side power switching MOSFETs coupled between respective power supply terminals, and a common node thereof coupled through an inductor to a regulated voltage output, said method comprising the steps of:
 (a) performing a synchronous conduction cycle measurement of the value of reverse conduction voltage ($V_{ON}$), and an asynchronous conduction cycle measurement of the value of body diode conduction voltage ($V_{DF}$) of said low side power MOSFET; and
 (b) subjecting said values of reverse conduction voltage ($V_{ON}$), and body diode conduction voltage ($V_{DF}$) of said low side power MOSFET as measured in step (a) to a two-dimensional transform function that is effective to produce values for current and temperature.

8. The method according to claim 7, wherein step (b) includes storing a two-dimensional mapping function of current vs. temperature values in terms of reverse conduction voltage ($V_{ON}$) and body diode conduction voltage ($V_{DF}$) of said low side power MOSFET temperature, and coupling said value of reverse conduction voltage ($V_{ON}$), and said value of body diode conduction voltage ($V_{DF}$) of said low side power MOSFET to said two-dimensional mapping function and deriving therefrom values of said current and temperature for said low side power MOSFET.

9. The method according to claim 8, wherein step (b) comprises interpolating values of current and temperature for said low side power MOSFET from values of current and temperature contained in said two-dimensional mapping function.

10. For use with a buck mode DC-DC voltage converter having first and second electronic power switching devices coupled between respective power supply terminals, and a common node thereof coupled through an inductor to a regulated voltage output voltage terminal, an arrangement for deriving a measure of current through and associated temperature of operation of said switching devices comprising the steps of:
 parameter measurement circuitry which is operative to measure said first and second electronic parameters of one of said first and second electronic power switching devices; and
 a processing unit which is operative to process values of said first and second electronic parameters as measured by said parameter measurement circuitry in accordance with a transform function that is effective to produce values for said current and temperature based upon said measured first and second electronic parameters of one of said first and second electronic power switching devices.

11. The arrangement according to claim 10, wherein said processing unit contains a two-dimensional mapping function of current and temperature values in terms of said first and second electronic parameters of said one of said first and second electronic power switching devices, and is operative to transform measured values of said first and second electronic parameters into values of said current and temperature for said one of said first and second electronic power switching devices in accordance with said two-dimensional mapping function.

12. The arrangement according to claim 11, wherein said first and second electronic power switching devices comprise power MOSFETs, and said first and second electronic parameters correspond to reverse conduction voltage ($V_{ON}$) and body diode conduction voltage ($V_{DF}$) of said one of said first and second power MOSFETs.

13. The arrangement according to claim 12, wherein said parameter measurement circuitry is operative to measure said conduction voltage ($V_{ON}$) during a synchronous conduction cycle and to measure said body diode conduction voltage ($V_{DF}$) during an asynchronous conduction cycle for said one of said first and second power MOSFETs.

14. The arrangement according to claim 13, wherein said processing unit is operative to interpolate values of current and temperature for said one of said first and second electronic power MOSFETs from values of current and temperature contained in said map.

15. The arrangement according to claim 10, wherein said first and second electronic power switching devices comprise respective high side and low side power MOSFETs of said DC-DC voltage converter, and said first and second electronic parameters correspond to reverse conduction voltage ($V_{ON}$) and body diode conduction voltage ($V_{DF}$) of said low side power MOSFET.

* * * * *